March 7, 1950  H. A. REEB  2,499,682
ANIMAL TRAP
Filed May 28, 1946  2 Sheets-Sheet 1
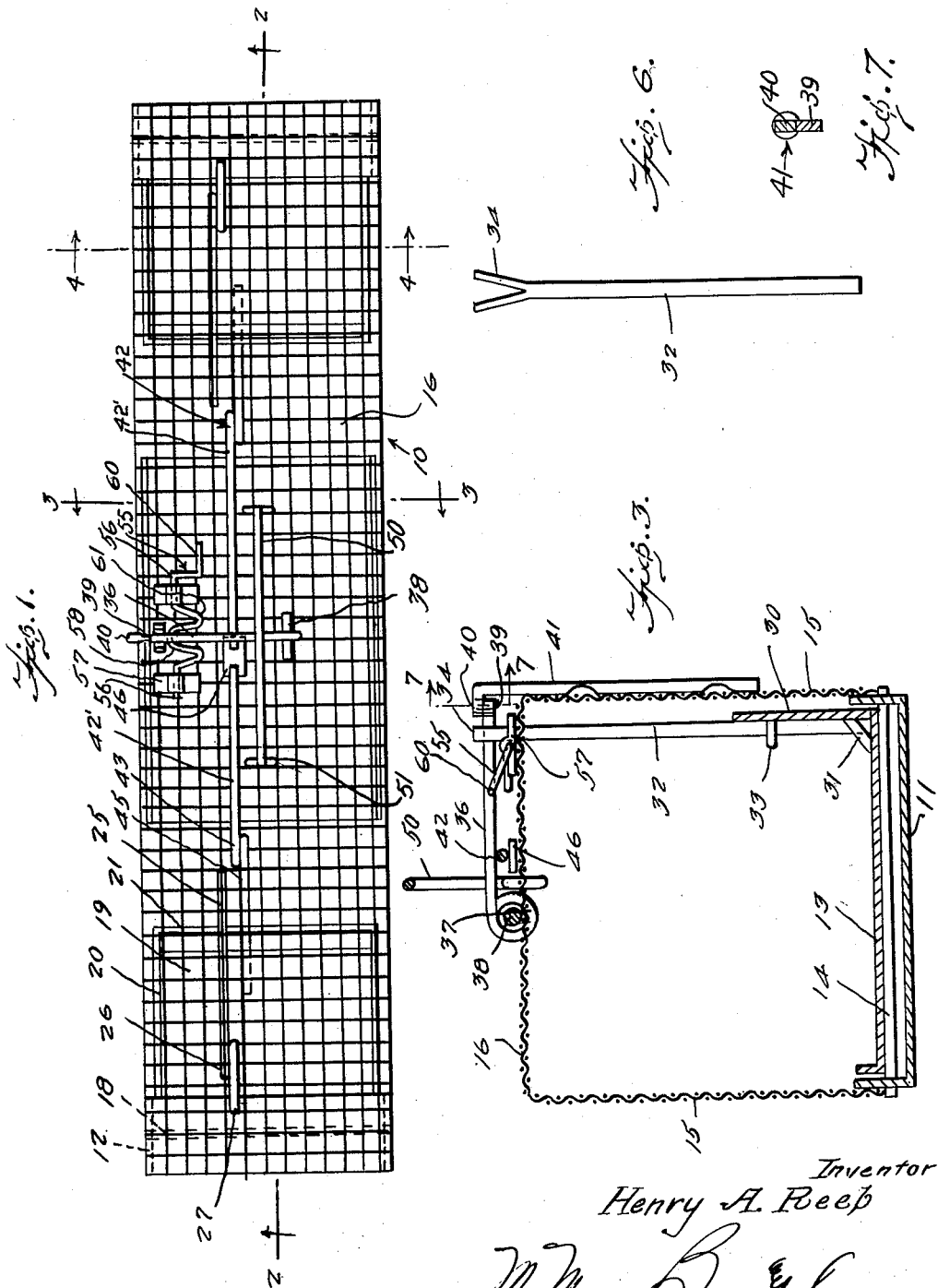
Inventor
Henry A. Reeb
Attorneys

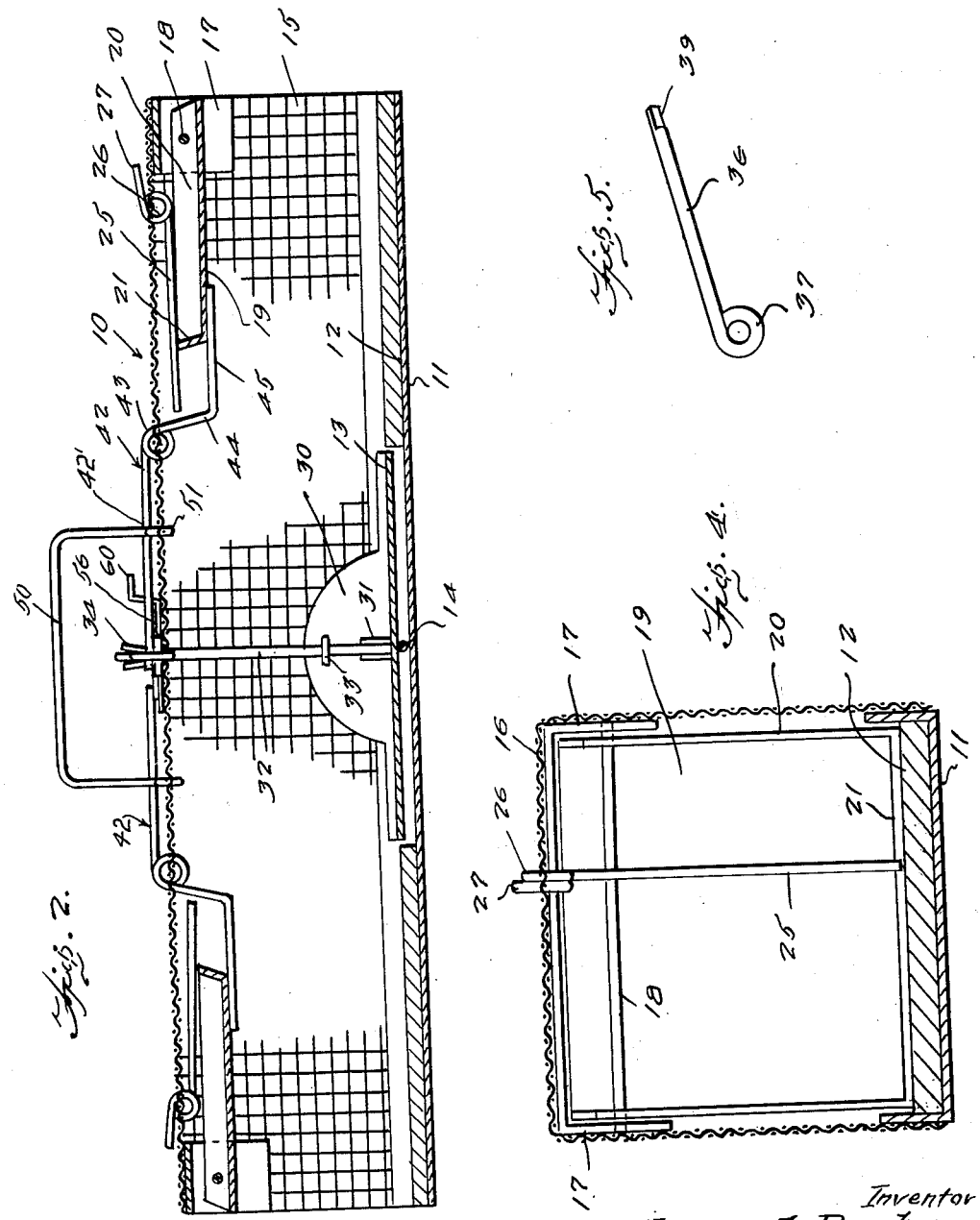

Patented Mar. 7, 1950

2,499,682

UNITED STATES PATENT OFFICE 2,499,682

ANIMAL TRAP

Henry A. Reeb, Dixon, Calif.

Application May 28, 1946, Serial No. 672,760

3 Claims. (Cl. 43—61)

This invention relates to an animal trap, and more particularly to such a trap for catching small animals such as rats, mice, and the like.

A primary object of this invention is the provision of an improved animal trap for rodents or the like characterized by means whereby an apparently clear passage is provided for the animal, and having means for simultaneously closing both ends of the trap when a rodent enters.

An additional object of the invention is the provision of such a trap provided with tiltable means for releasing end gates simultaneously when the tiltable means are stepped upon by an animal.

A further object of the invention is the provision of such a device having means whereby the animals are caught alive and uninjured.

Other objects reside in the combinations of elements, arrangements of parts, and features of construction, all as will be more fully pointed out hereinafter and disclosed in the accompanying drawings, wherein there is shown a preferred embodiment of this inventive concept.

In the drawings:

Figure 1 is a top plan view of one form of trap embodying features of the instant inventive concept.

Figure 2 is a sectional view taken substantially along the line 2—2 of Figure 1, as viewed in the direction indicated by the arrows.

Figure 3 is an enlarged sectional view taken substantially along the line 3—3 of Figure 1, as viewed in the direction indicated by the arrows.

Figure 4 is an enlarged transverse vertical section taken along line 4—4 of Figure 1, the gate being shown closed.

Fig. 4 is an enlarged plan view of a constructional detail.

Figure 6 is an enlarged elevational view of an additional constructional detail.

Figure 7 is an enlarged fragmentary vertical section taken on line 7—7 of Figure 3, parts omitted.

Similar reference characters refer to similar parts throughout the several views of the drawings.

Referring now to the drawings, there is generally indicated at 10 a wire enclosure including a base 11 of solid material and provided with floor boards 12 extending from each end thereof towards the center, but stopping in spaced relation to provide accommodation for a tiltable plate 13 pivotally mounted, as on an axle 14, and spaced a distance above the base 11.

The enclosure also comprises side walls 15 and a top 16 of foraminous material such as wire mesh.

The ends of the enclosure 10 are normally open, and the foraminous side walls are provided near their ends with side plates 17 within which are journaled the extremities of axles 18 pivotally supporting gates 19. Each of the gates 19 is provided with side flanges 20 and an inwardly turned bottom flange 21 normally positioned interiorly of the cage.

Gate-latching members 25 are provided including loops 26 adapted pivotally to surround one of the strands of the foraminous material of the top 16 and provided with finger-engaging portions 27 extending exteriorly of the top. When the trap is in closed position, the members 25 fall to the position shown in Figure 4 engaging the bottom flange 21 of the associated gate 19 in such manner as to securely hold the gate in closed position. Both the gate 19 and the latching members 25 are adapted to be rotated in a downward direction to close the trap by the force of gravity, and moved manually to their uppermost position, being secured in open position in a manner to be more fully described hereinafter.

Referring back now to the tiltable plate 13, it will be seen that the plate is provided with an upwardly extending lug or flange 30 and a socket 31 adjacent the flange in which seats the extremity of an upright 32, suitable fastening means 33 also being provided at an intermediate point of the flange 30 therefor. The member 32 terminates at its upper extremity in a fork 34 extending upwardly through the top 19 of the cage.

Adapted to extend into the fork 34 is a member 36 provided with a loop 37 at one extremity adapted for pivotal mounting, as on an axle 38, positioned on the top of the cage.

The member 36 terminates in a reduced extremity 39 adapted to engage under a projection or detent 40, Figure 7, carried by an upright member 41 secured to the side 15 of the enclosure adjacent the lug 30 of the pivoted trip plate 13.

Gate-retaining members generally indicated at 42 are provided, and each includes a longitudinally extending member 42' provided with an intermediate loop portion 43 pivotally mounted on one of the strands of the wire mesh of the top of the enclosure. A depending portion 44 extends from each loop 43 interiorly of the cage, and a further longitudinally extending portion 45 is adapted to underlie each of the gates 19.

The left-hand member 42, Figures 1 and 2, has permanently affixed thereto at its extremity a plate 46 of a length sufficient to underlie the extremity of the opposite member 42.

The opposed member 42 is of a length sufficient, when the trap is set, to extend beneath the trip member 36.

From the foregoing, the operation of the device should be readily understandable. In setting the trap, the gates 19 are elevated to raised position about the pivots 18 and the members 45 positioned thereunder. The members 42 are then so positioned that the extremity of the portion 42' of the right-hand member 42, Figures 1 and 2, overlies the plate 46 attached to the other member 42, and the member 36 is then extended transversely across the juncture of the two members and its reduced extremity 39 engaged beneath the detent 40. Obviously, with the parts in this position, the gates are retained in raised position. Suitable bait is then positioned on the trip plate 13, and the device is set. When an animal enters the device from either end and steps upon the trip plate 13, tilting of the plate causes movement of the member 32 and support 34, which dislodges the reduced extremity 39 of the member 31 from the detent 40, thus permitting release of the members 42 which in turn permits the gates 19 to fall by gravity, and correspondingly, permits the fall of the gate-latching members 25. Thus, it will be seen that an animal is secured against egress from either end of the device, substantially immediately upon touching the trip plate, the distance between the extremities of the trip plate and the extremities of the trap being sufficiently great as to preclude the animal escaping during the relatively short time required for the gates to fall to latched position.

A carrying handle 50 is also provided for the device and is suitably secured, as by means of loops 51 engaging in the wire mesh of the top of the device to permit the article to be transported from place to place. Correspondingly, a safety latch is provided to hold the device in set position during such transportation, and takes the form of a generally W-shaped member 55, including axles 56 journaled in suitable brackets 57 on the top of the device. The central loop 58 of the W-shaped member 55 is adapted to engage on opposite sides of the member 39 when the axle 56 is rotated, as by means of an offset hand crank 60 positioned on one end thereof.

When it is desired to set the latch, partial rotation of the crank 60 will cause the members 61 forming the opposite sides of the central loop 58 to rise on opposite sides of the member 36, thus securing the same against dislodgement from its associated detent 40.

From the foregoing it will now be seen that there is herein provided an improved animal trap which accomplishes all the objects of this invention.

Since various embodiments may be made of this inventive concept, and as various modifications may be made in the embodiment hereinbefore shown and described, it is to be understood that all matter herein is to be interpreted merely as illustrative and not in a limiting sense.

I claim:

1. In an animal trap, an elongated receptacle having openings at each end, pivotally mounted gates adjacent each opening, means for supporting said gates in open positions, a pivoted plate in the center of the base of said receptacle, means carried by said plate for releasing said means for supporting said gates, said last-mentioned means including a bifurcated upright extending out of said receptacle, a trigger member positioned between the bifurcations and engaging said means for supporting said gates, and a detent member mounted upon the receptacle and engaging the trigger member to maintain the trap set until the pivoted plate is moved.

2. In an animal trap, an elongated receptacle having openings at each end, pivotally mounted gates adjacent each opening, means for supporting said gates in open positions, a pivoted plate in the center of the base of said receptacle, means carried by said plate for releasing said means for supporting said gates, said last-mentioned means including a bifurcated upright extending out of said receptacle, a trigger member positioned between the bifurcations and engaging said means for supporting said gates, a detent member mounted upon the receptacle and engaging the trigger member to maintain the trap set, and lock means for retaining said trigger against displacement, said lock means including a rotatable member having projections movable into engagement with opposite sides of said trigger.

3. An animal trap, comprising an elongated receptacle having its opposite ends open, gates pivotally mounted upon the receptacle near its open ends, means to support the gates in open positions, a pivoted element arranged near the center of the receptacle for movement by the animal, an upstanding member secured to the pivoted element and projecting above the receptacle, a trigger member pivotally secured to the top of the receptacle and extending transversely of and engaging the upstanding member and shiftable laterally by the upstanding member, the trigger member also engaging the means to support the gates in open positions, and a detent element mounted upon the receptacle and engaging the trigger to maintain the trap set.

HENRY A. REEB.

REFERENCES CITED

The following references are of record in the file of this patent:

UNITED STATES PATENTS

| Number | Name | Date |
| --- | --- | --- |
| 1,441,523 | Pittman | Jan. 9, 1923 |
| 1,477,446 | Reisiger | Dec. 11, 1923 |
| 1,614,896 | Peck | Jan. 18, 1927 |

FOREIGN PATENTS

| Number | Country | Date |
| --- | --- | --- |
| 425,212 | Great Britain | Mar. 11, 1935 |